UNITED STATES PATENT OFFICE.

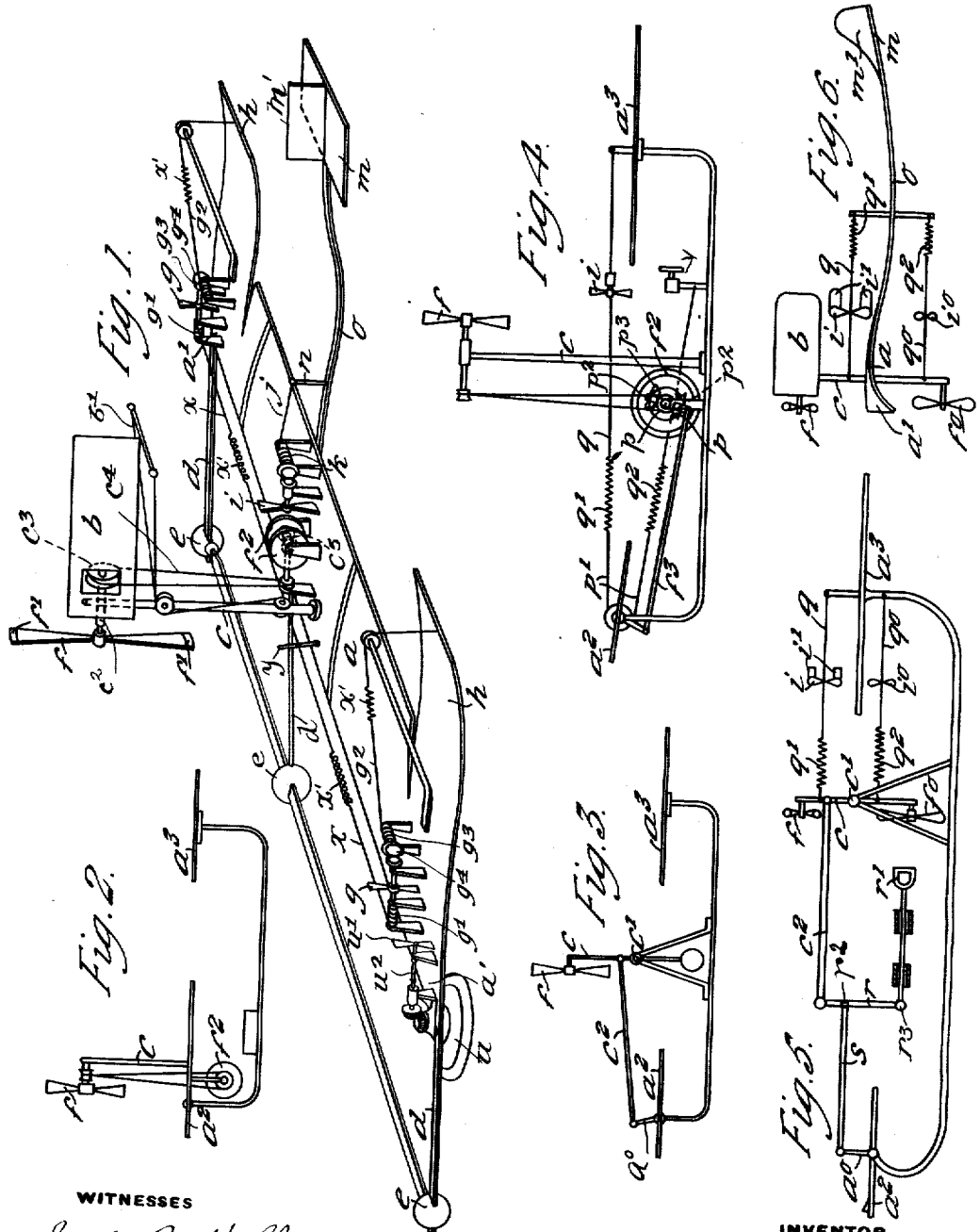

SAM LEONARD WALKDEN, OF MUSWELL HILL, LONDON, ENGLAND.

AEROPLANE AND THE LIKE.

1,152,063. Specification of Letters Patent. Patented Aug. 31, 1915.

Application filed March 28, 1910. Serial No. 551,954.

*To all whom it may concern:*

Be it known that I, SAM LEONARD WALKDEN, a subject of the King of Great Britain, residing at 43 Collingwood avenue, Muswell Hill, in the county of London, England, engineer, have invented certain new and useful Improvements in Aeroplanes and the like, of which the following is a specification.

The object of this invention is to obviate, by automatically operating devices, undue changes of poise in flying machines, and thereby preserve automatically the stability of movement of the apparatus through the air.

Complete automatic stability can be obtained if automatically operating devices are provided which so coöperate with each other as to resist both slow and sudden changes of poise, including those changes of poise associated with the free oscillations about the mean poise, and the invention is accordingly characterized by the employment of one or more of the following parts, which, when used in combination, are coöperatively related:—(1) One or more comparatively small and slowly acting wind operated fans adapted to resist slow and permanent changes of poise of the flying machine, so as to determine or help to determine a mean poise and mean relative headway. (2) An aeroplane surface so correlated with a heavy mass as to resist, or counteract especially when the relative headway is maintained, sudden change in the plane of movement of the flying machine by reason of the tilting inertia of the mass causing the surface or a part thereof. (3) A comparatively large and powerful wind driven fan driving fly wheel masses, so as to have fly-wheel energy, and so carried upon the machine as to resist sudden alterations of relative headway and damp out oscillations of poise about the mean poise.

In the accompanying drawings Figure 1 shows diagrammatically in perspective a glider fitted with the various types of automatic stabilizing devices according to this invention; Fig. 2 is a diagrammatic longitudinal section showing a modified arrangement of flywheel fan stabilizer; Figs. 3 and 4 similar views showing further modifications; Fig. 5 a similar view showing the two types of stabilizing fans with their associated auxiliary fans; and Fig. 6 a view of a glider showing another arrangement of primary stabilizing fans with associated auxiliary devices. In completely carrying out this invention, slow changes of poise are resisted, and a mean poise and mean relative headway determined for the machine by means of one or more fans of small power (which may be damped by air vanes) operated by the relative wind or wind relative to the machine, and each so correlated with an aeroplane surface or surfaces (which may, as throughout this specification, be part or parts of a large surface or surfaces) as to tend to give a definite tilt or deflection to the associated surface or surfaces, relatively to another aeroplane surface or surfaces, for a given relative headway of the machine at the point where the fan is mounted, and so as to tend to alter this relative tilting of the surfaces on the occurrence of an alteration in the relative headway of the fan. For example, in Fig. 1, a wind operated fan $i$ is mounted on the machine, so that, when it is rotated by the relative wind, it winds the cord $j$ upon the drum $k$ and thereby tilts the elevating plane $m$ relatively to the main plane $a$ by means of the yielding or springy longitudinally extending device or arm $o$ and the post $n$ fixed to the arm $o$ and attached to the cord $j$. Normally the fan $i$ is at rest maintaining the cord $j$ in tension against the pull of the arm $o$ that by its resilience or pressure on the plane $m$ keeps the fan loaded, but on the machine traveling more downward or upward than the mean poise for which the apparatus is adjusted the machine increases or decreases respectively in relative headway, and thereby causes the wind operated fan $i$ to wind up or let down the elevating plane $m$, relatively to the main plane $a$, so as to steer the machine back to the mean poise from which it deviated. But, owing to the inertia of the machine, particularly the inertia which may be arranged to resist sudden disturbance of poise, the machine will oscillate past the mean poise after recovering from a deviation from the mean poise, and since these oscillations may increase in amplitude and lead to loss of balance of the machine, especially when succeeding gusts happen to synchronize with the oscillations, it may be necessary for complete stability to provide an auxiliary device for damping or destroying these oscillations, such as the fan $f$ of Fig. 1. As further examples, in Fig. 1, the wind operated fans, $g, g$ similar to fan $i$, are mounted near the deflectable lateral extremities $a', a'$ of the main plane $a$. On the machine, while flying steadily, being accidentally tilted in its lateral poise, so as to make one lateral extremity higher than the other, and cause the machine to circle away from the side of the extremity which is higher, the fan $g$ near that outer extremity, being driven by the increased relative wind at that extremity, turns the drum $g^3$ to wind up or let out the cord $g^2$ so as to tilt the attached flexible aeroplane surface or articulated elevator $h$ relatively to the other parts of the plane $a'$ and $a$, and thereby produce a righting torque operating to restore the horizontal lateral poise. It will be understood that the fan $g$ at the lower lateral extremity of the machine, when the machine is tilted in its lateral poise, will by reason of the reduced relative wind at that extremity, let down or wind up and tilt its aeroplane surface $h$ relatively to the other aeroplane surface $h$ at the higher extremity, so as further to increase the lateral righting torque.

It will be further seen that, by reason of the cord connections $x$ passing across the machine and constituting portions of the connections between the two surfaces $h, h$, on one surface being deflected down (as by wind pressure or by a fan or by the manual control lever $y$) the other surface tends to be pulled up, as advantageous for the lateral control; and that in the springs $x'$ interposed in the cord connections between the surfaces $h$ and $h$, means are exemplified whereby simultaneously with their differential deflection for lateral control, the two surfaces $h, h$ may have a superimposed deflection up or down, both together, as advantageous for the longitudinal control. In so determining the deflections the connections will also be seen to determine the wind pressures on the surfaces.

The same fans $g, g$ may alternately or additionally be arranged to tilt a longitudinally disposed vertical surface to restore lateral equilibrium. As shown in Fig. 1, each fan $g$ is arranged to wind up a suitably guided cord $x$ on the drum $g'$ so as to pull on the arm $b'$ attached to plane $b$, and thereby tend to deflect the rear part of the flexible elevated plane $b$ away from the lateral extremity of the machine on which the fan is mounted. If, for example, the machine should now tilt up on the right and down on the left, the associated circling movement of the machine, to the left, will make the right hand and higher fan travel faster than the left hand and lower fan, so that the right hand fan will prevail over the other and tilting the rear portion of the flexible plane $b$ to the left will cause the relative wind to press on the left of $b$ so as to help to restore the lateral poise through the leverage of the standard $c$ on which the plane $b$ is mounted. Moreover, the plane $b$, being now deflected as described, is deflected with respect to the vertical tail plane $m'$, and so produces a torque tending to steer the machine away from the lower left-hand side and thereby further promotes the lateral self-righting torque.

In order to resist sudden disturbance of poise, a heavy concentrated mass is carried upon the machine, forwardly of a main or auxiliary aeroplane surface, so that on a gust attacking the machine and tending to raise it as well as to raise the aeroplane surface forwardly of which the mass is placed, the mass, by reason of its inertia resistance to being accelerated upward, causes a sufficiently counteracting downsteering deflection of its connected aeroplane surface relatively to another aeroplane surface, which latter surface is preferably a yieldingly-held rear elevator normally compensating the tendency of the mass to depress the nose of the aeroplane. For example in Fig. 1, rods or other supporting frames or members $d$ projecting forwardly from the warpable or otherwise deflectable aeroplane surfaces $a'$ carry at their outer ends a heavy mass or masses $e$. On a gust suddenly tending to disturb the machine and cause it to move upwardly or downwardly from its then plane of movement, each heavy mass $e$ resists by its inertia the upward or downward deviation, and this inertia also tends to deflect the corresponding extremity $a'$ of the surface $a$ relatively to the portions of surface $a$ near the longitudinal axis of the machine, and so deflect the whole main plane surface $a$ in a downsteering or upsteering sense, respectively, relatively to the rearwardly yielding surfaces $m$ and $h$ so as further to counteract the disturbing effect of the gust. Since this upward and downward steering effect becomes less effective or even inoperative in the absence of considerable headway relative to the air, and since rear gusts have the effect of reducing and even reversing the relative headway, it is necessary, for complete stability, to provide means for resisting sudden loss of headway, such as the fan $f$ in Fig. 1. The masses $e$ of this figure not only act together as described to resist sudden change of the longitudinal plane of movement of the machine, but in the event of the gust tending to tilt one side of the machine, as for instance the left side, upward or downward, the mass $e$ at the left hand side of the machine deflects or warps its extremity $a'$ of the main plane $a$ downward or upward relatively to the central parts of the main plane and plane $h$, so as to resist the sudden tilting of the machine. Further small horizontal flywheels may be employed as the heavy masses and be rotated by wind driven fans generally and preferably left-handedly on the left side and right-handedly on the right as viewed from above, so as to act gyroscopically by the precession of the axes of the flywheels consequent on change of lateral poise of the ship to produce or increase the torsion force on the wings of the main plane or other equilibrating force. Instead of two or more flywheels a single small flywheel may be used in this manner. It is to be understood that such fans, driving flywheels, also act to assist the general stability of the aeroplane by resisting changes in relative headway, and when placed toward the lateral extremities of the aeroplane they assist the lateral stability by resisting change of relative headway of the lateral extremities and by resisting, in consequence, the commencement of the circling or wheeling of the aeroplane which militates against the recovery of lateral poise.

In Fig. 1 is shown, by way of example, a gyroscopic flywheel $u$ mounted at the lateral extremity of the main plane $a$ and adapted to be rotated left-handedly, as viewed from above, by the wind-driven fan $u'$ by means of the shaft $u^2$ which may be of a flexible nature. In addition to acting in the manner of fan $f$ in promoting stability, this gyroscopic flywheel $u$ resists change of lateral poise by warping the wing $a'$ to which it is attached, upwardly or downwardly by gyroscopic precession according to whether the lateral poise is tilting left-handedly or right-handedly as viewed from behind the glider. A similar gyroscopic flywheel may be used at the other lateral extremity.

In order to damp out or destroy the oscillations of poise about the mean poise, which oscillations are due to the inertia of the machine carrying it past the mean poise determined by the device that resists slow and permanent change of poise, and in order to help to preserve sufficient headway in sudden rear gusts to keep in operation the other up-and-down steering appliances, a freely revolving wind-driven fan of considerable power and provided with means such as flywheel masses (which may be rigidly attached to the fan) adapted to absorb and give out considerable flywheel energy, is journaled upon the machine and preferably in an elevated position above an aeroplane surface. When the machine points downward or upward in its oscillations about the mean poise, so as to tend to gain or lose relative headway respectively, this fan is prevented by its flywheel effect from an equally rapid acceleration or retardation of its speed of rotation, so that it resists the increase or decrease in the relative headway of the machine and thereby resists the continuation of the oscillation, so far as such continuation depends on the machine acquiring such increased or diminished headway as will not permit it to remain at its mean poise when reached. Further, on a rear gust tending to overtake the machine so as to tend to reduce or even reverse its relative headway and thereby render inoperative the upward and downward steering effects of the heavy mass for resisting sudden changes, and the small fan for resisting slow changes of poise, the large fan has retardation of its speed of rotation resisted by its stored flywheel energy so as to itself resist and reduce the loss of headway of the machine due to the rear gust.

For example, in Fig. 1, the freely revolving wind driven fan $f$, of considerable power and provided with heavy masses $f'$ at its blade tips, so that it is endued with considerable flywheel effect, is journaled at the top of the standard $c$ in an elevated position above the aeroplane surface $a$. On the machine pointing steeply downward or upward during its oscillations of poise and therefore tending to gain or lose headway respectively, the fan $f$ resists such acceleration or retardation of headway in consequence of the flywheel masses $f'$ resisting acceleration or retardation of the speed of rotation of the fan $f$; and in righting itself to its mean poise through the action of fan $i$, the glider has less tendency to oscillate past the mean poise, in consequence of the increase or decrease of headway having been resisted by fan $f$. Moreover, in consequence of the fan $f$ being carried in the elevated position as shown in Fig. 1, the backward and forward thrusts given by the fan, and its resistance to accelerations and retardations of headway, in acting through the leverage of standard $c$, tend to deflect the aeroplane surface $a$, relatively to the surfaces $m$ and $h$, in an upsteering or downsteering sense respectively, and also to deflect the whole machine in the same senses, so as to resist further the changes of headway and the associated changes of poise or oscillations that succeeding gusts might otherwise amplify. The fan $f$ not only resists oscillations as described, but when a rear gust tends to overtake the machine and so tends to reduce or even reverse its headway and render the up and down steering actions of fan $i$ and masses $e$ inoperative, the fan $f$ has its loss of speed of rotation resisted by its flywheel effect so as to itself resist the loss of headway of the machine and thereby maintain the stabilizing efficiencies of fan $i$ and the masses $e$ and associated surfaces during the rear gust.

Though it is preferable that the flywheel fan should have its flywheel mass rigidly attached to it, it may be provided with a flywheel mass to which it is geared as, for example, in Fig. 1, where the fan $f$ drives the oppositely rotating flywheels $f^2$ by means of the pulleys $c^3$, belt $c^4$ and bevel wheels $c^5$ shown in the drawing. Such flywheel mass, rotated by a wind driven fan or fans, instead of being balanced as the flywheels $f^2$ of Fig. 1, may, if preferred, be carried so that its gyroscopic action aids the stability in any known manner. For example, in Fig. 1 the wind driven fan $u'$ is shown driving the horizontal flywheel $u$ left-handedly as viewed from above, by means of the flexible shaft $u^2$ and bevel gearing at the ends of the shaft. On a sudden gust tending to tilt the machine up on that side and thereby tilt the plane of the flywheel left-handedly as viewed from the front of the machine, the plane of the flywheel, in accordance with the dynamical properties exhibited by gyroscopes, endeavors to tilt right-handedly as viewed from the center of the machine, and thereby resists the tilting of the machine both by tilting the deflectable end $a'$ of the main plane $a$ downward in front, so as to reduce or even reverse its lift, and by offering a direct gyroscopic resistance to the lateral disturbing torque on the machine through being permitted to tilt in a fore and aft direction. As shown in the drawing, the flywheel mass not only acts as above described, but, by reason of its forward position on the rod $d$, and its inertia, acts similarly to the mass $e$, which it aids, and for which it may be used as a substitute. Instead of directly tilting the main plane, the flywheel may obviously be arranged to tilt an auxiliary plane and preferably an auxiliary lateral tail elevating plane that by suitable leverage over the main plane effects the warping of the main plane and so raises or lowers one side of the ship relatively to the other. Though only one wind-driven flywheel $u$ is shown, a similar flywheel may be used at the other lateral extremity of the flying machine to aid the one shown in resisting disturbance of the poise of the machine.

When the machine is fitted with a power driven propeller, so as to constitute a power driven aeroplane, the damping effect of such propeller upon the oscillations and its resistance to loss of headway (especially when the rotating parts connected to the propeller are heavy and the engine's torque does not decrease with decrease in its speed of rotation) may be sufficient to render a solely wind-driven flywheel fan unnecessary for complete stability.

Though only one wind-driven flywheel fan has been described, and shown in Fig. 1, a plurality of such fans may be used upon the glider.

In the modified arrangement of wind-driven fan stabilizer shown diagrammatically in Fig. 2, the fan $f$ is journaled on a standard $c$ mounted directly on a forward tilting plane $a^2$ and is geared with a flywheel $f^2$ carried by a depending bracket and serving to counterpoise the fan so as to bring the center of gravity of the fan and its accessories coplanar with the normal horizontal position of the plane $a^2$. The resistance to change of translational velocity of the fan $f$ causes the plane $a^2$ to be tilted when the longitudinal poise is disturbed.

In Fig. 3, the standard $c$ is pivotally supported at $c'$ on a bracket rigid with the main frame and balanced by a counterweight and is connected by a link $c^2$ and an arm $a^0$ with the front plane $a^2$. The rear plane $a^3$ may be fixed or it may be linked with the front plane $a^2$ so as to be automatically tilted simultaneously therewith although not necessarily in the same sense or to the same extent. As before, the plane or planes are tilted when the longitudinal poise is changed on account of the resistance to change of translational velocity offered by the fan.

In Fig. 4 the fan $f$ mounted on a standard $c$ rigid with the main frame, drives the flywheel $f^2$ through a belt and differential gear and thereby opposes oscillation of the longitudinal plane of movement of the ship. The differential gear consists of the usual two oppositely rotating bevel wheels $p$, one rotated by the fan and the other connected to rotate with the flywheel, and between these bevel wheels, and transmitting the necessary power between them is a pair of pinions $p^3$ mounted in a cage or frame $p^2$, $p^2$, that may rotate or oscillate coaxially with the bevel wheels, one way or the other according to whether the fan's or the flywheel's bevel wheel is rotating the faster. This cage or frame $p^2$ is connected to the elevating plane $a^2$ by the link $f^3$ so that on the fan and its bevel wheel tending to overtake the flywheel and its bevel wheel, as when the aeroplane sweeps downward and gathers speed, the consequent rotation of the cage carrying the pinions tilts the elevating plane $a$ in a manner to counteract the downward movement of the aeroplane. It will be evident that this fan device does nothing of itself to determine the mean plane of movement and poise of the aeroplane, but only damps out or resists oscillations about the mean poise because these oscillations are associated with accelerations of headway that excite the counteracting steering movements of the device. The figure, therefore, also illustrates the device for opposing slow and permanent change of the longitudinal plane of movement of the ship which may act in unison with the device for opposing more sudden change of the plane of longitudinal movement. A wind driven fan $i$ operates to wind up by twisting a multiple cord $e$ which is fixed at one end, and at the other end is connected through a tension spring $q'$ with another cord $p'$ which is lapped around the axle of an elevating plane, such as $a^2$, and connected at its other end through a tension spring $q^2$ with a fixed point or with a hand-operated winding device $v$ by which the tension of the cords and springs may be varied so as to change or adjust the persistent mean poise of the plane.

In the modification shown in Fig. 6, the fan $i$ which resists slow and permanent changes of poise and relative headway, is damped by air vanes $i'$ that resist its quick rotation, and is mounted upon the multiple cord $q$ so as to twist and shorten the cord, and pull on the spring $q'$ and thereby wind up the tail rod $o$ and tail plane $m$ in similar manner and circumstances to those in which fan $i$ of Fig. 1 wound up its elevating plane $m$. Fig. 6 also shows a fan $i^0$ of similar character to fan $i$ but of weaker and opposite tilting power on the plane $m$ for given increases in the relative headway, and having less resistance, such as air vanes, to its quick rotation. On a sudden strong transient head gust striking the glider, the quicker acting fan $i^0$ momentarily tilts or tends to tilt the plane $m$ in a downsteering sense relative to plane $a$ before the slower acting fan $i$ has had time to overpower it, and thereby counteracts the tendency which fan $i$ has to disturb the poise in a sudden strong head gust. A similar effect to that produced by the fan $i^0$ may, however, be obtained alternatively or additionally by combining with the main plane $a$ a comparatively rigid downsteering surface or surfaces as by forming the main plane $a$ in Fig. 6 with downwardly curved front corners $a'$ at its lateral extremities. Using the front edges of the lateral extremities of the aeroplane in this manner has the additional advantage of aiding the lateral stability by producing a righting torque when the machine leans and circles to the side it leans to, and when such planes are additionally warped by hand or otherwise, especially if more warped on the side requiring lowering, as by means of cranked levers, there may be no necessity to steer the ship by a rudder to the side which is being lowered as has been found necessary in known systems of warping the planes. Alternatively, instead of using the front edges of the aeroplane, auxiliary downsteering planes may be used at the lateral extremities with similar advantage. Fig. 6 also shows a flywheel fan $f^0$ carried below the aeroplane surface $a$ so as to tend to tilt that surface in the opposite sense to the fan $f$ above the surface, but it is advantageous in this arrangement to have the fan $f^0$ with less flywheel energy than the fan $f$ so that it only effectively opposes the tilting action of fan $f$ momentarily in a sudden strong head gust.

Referring to Fig. 5, $a^2$ is a front elevating plane and $a^3$ a rigidly mounted supporting plane; $f$ is a wind-driven fan which may be of small power but is either itself loaded so as to act as its own flywheel and have considerable fly wheel energy or is geared with a flywheel, and $f^0$ is a larger fan which has less flywheel energy than the fan $f$. These fans are mounted and linked with the elevating plane $a^2$ so that fan $f$ tilts the plane $a^2$ to steer the ship upward on the occurrence of a sudden transient head gust, while fan $f^0$ produces a down-steering effect. This down-steering effect momentarily reduces or overpowers the up-steering effect of fan $f$, so that the upward sweep of the ship on the occurrence of the head gust is retarded and it may even be preceded by a momentary downward sweep.

As shown in the drawing the fans $f$, $f^0$ are journaled on a normally vertical rod or frame $c$, the former above and the other below a fixed fulcrum $c'$, about which the frame $c$ can rock in a fore and aft vertical plane. A link $c^2$ attached to the frame $c$ above the fulcrum may be connected directly with an arm $a^0$ projecting upward from the plane $a^2$ or its pivot, or as shown in Fig. 5, it may be connected with this arm $a^0$ through a link $r$ and a second link $s$ pivoted at $r^2$ to the link $r$, which may itself be pivoted at $r^3$ on a part $r'$ suitably carried by the machine, which part may have the form of a guided handle by which the pivot $r^2$ and the link $s$ may be shifted whereby the plane $a^2$ may be tilted by hand independently of and without interfering with the action of the fans $f$, $f^0$, $i$ and $i^0$, or whereby the amount of tilt of the aeroplane surface may be adjusted for a given wind pressure on the fan.

The wind-driven fan $i$ which is of the type designed to prevent slow and permanent change of longitudinal poise, is arranged for example to wind a multiple cord $q$ connected at one end to a fixed point and at the other end through a spring $q'$ to a point on the frame $c$ above the fulcrum $c'$. This fan $i$ is of greater tilting power than the associated downsteering fan $i^0$ and is suitably damped, as by means of the air vanes $i'$. The down-steering fan $i^0$ which need only be of small tilting power and is comparatively undamped, is mounted in a similar manner to the fan $i$ to wind a multiple cord $q^0$ connected through spring $q^2$ to a point of the frame $c$ below the fulcrum $c'$.

Though only three yieldingly attached auxiliary planes $h$, $h$ and $m$ are shown in Fig. 1, any number of such planes may be attached to the main plane at any distance from the axis of the machine, especially when the main plane is warpable.

Having now described the nature of my said invention and the best means I know of carrying the same into practical effect, I claim:—

1. In a flying machine, the combination of a deflectable wing surface on the left-hand side and a similar one on the right-hand side, an elevator surface connected in and to the rear of the left-hand deflectable wing surface and deflectable relatively thereto and a similar elevator surface connected in and to the rear of the right-hand deflectable wing surface and deflectable relatively thereto, and connections across the machine and between the two elevator surfaces by means of which on one elevator being deflected downward relatively to its deflectable wing surface the other elevator tends to be pulled up relatively to its deflectable wing surface, said connections being also such as allow of both elevators moving up or down together simultaneously with their differential deflections.

2. In a flying machine having wings extending to the left and right of its longitudinal axis, the combination of a heavy mass, a longitudinally disposed rod-like frame on the left-hand wing and a similar one on the right-hand wing connected through their forward ends to the heavy mass, an aeroplane surface attached to the rear of each frame, each frame and surface adapted to turn about a transverse axis to different angles of incidence with respect to the other frame and surface, a second aeroplane surface articulated at the rear of each frame and so deflectable with respect to the first surface on the same frame, and connections determining the deflection and consequent wind pressure on each second surface.

3. In a flying machine having wings extending to the left and right of its longitudinal axis, the combination of a heavy mass, a longitudinally disposed rod-like frame on the left-hand wing and a similar one on the right-hand wing connected through their forward ends to the heavy mass, an aeroplane surface attached to the rear of each frame, each frame and surface adapted to turn about a transverse axis to different angles of incidence with respect to the other frame and surface, a second aeroplane surface articulated at the rear of each frame and so deflectable with respect to the second surface on the other frame, and connections across the machine and between the two second surfaces by means of which on one second surface being deflected downward relatively to its first surface, the other second surface may be pulled up relatively to its first surface.

4. In a flying machine having wings extending to the left and right of its longitudinal axis, the combination of a heavy mass, a longitudinally disposed rod-like frame on the left-hand wing and a similar one on the right-hand wing connected through their forward ends to the heavy mass, an aeroplane surface attached to the rear of each frame, each frame and surface adapted to turn about a transverse axis to different angles of incidence with respect to the other frame and surface, a second aeroplane surface articulated at the rear of each frame and so deflectable with respect to the first surface on the same frame and also with respect to the second surface on the other frame, and connections across the machine and between the two second surfaces by means of which on one second surface being deflected downward relatively to its first surface the other second surface may be pulled up relatively to its first surface, the said connections being also adapted to allow a superimposed deflection of both second surfaces up or down together relatively to their first surfaces.

5. In a flying machine having wings extending to the left and right of its longitudinal axis, the combination of a heavy mass on the left-hand wing and a similar heavy mass on the right-hand wing, a longitudinally disposed rod-like frame on the left-hand wing and a similar one on the right-hand wing each connected through its forward end to the corresponding heavy mass, an aeroplane surface attached to the rear of each frame, each frame and surface adapted to turn about a transverse axis to different angles of incidence with respect to the other frame and surface, a second aeroplane surface articulated at the rear of each frame and so deflectable with respect to the first surface on the same frame, and connections determining the deflection and consequent wind pressure on each second surface.

6. In a flying machine having wings extending to the left and right of its longitudinal axis, the combination of a heavy mass on the left-hand wing and a similar heavy mass on the right-hand wing, a longitudinally disposed rod-like frame on the left-hand wing and a similar one on the right-hand wing each connected through its forward end to the corresponding heavy mass, an aeroplane surface attached to the rear of each frame, each frame and surface adapted to turn about a transverse axis to different angles of incidence with respect to the other frame and surface, a second aeroplane surface articulated at the rear of each frame and so deflectable with respect to the first surface on the same frame and also with respect to the second surface on the other frame, and connections across the machine and between the two surfaces by means of which on one second surface being deflected downward relatively to its first surface the other second surface may be pulled up relatively to its first surface.

7. In a flying machine having wings extending to the left and right of its longitudinal axis, the combination of a heavy mass on the left-hand wing and a similar heavy mass on the right-hand wing, a longitudinally disposed rod-like frame on the left-hand wing and a similar one on the right-hand wing each connected through its forward end to the corresponding heavy mass, an aeroplane surface attached to the rear of each frame, each frame and surface adapted to turn about a transverse axis to different angles of incidence with respect to the other frame and surface, a second aeroplane surface articulated at the rear of each frame and so deflectable with respect to the first surface on the same frame and also with respect to the second surface on the other frame, and connections across the machine and between the two second surfaces by means of which on one second surface being deflected downward relatively to its first surface the other second surface may be pulled up relatively to its first surface, the said connections being also adapted to allow a superimposed deflection of both second surfaces up or down together relatively to their first surfaces.

8. In a flying machine, an automatically operated stabilizing system, comprising in combination an aeroplane surface, a freely revolving wind-driven fan mounted on the machine, flywheel masses rotated by the fan and thereby opposing sudden changes of speed in the fan, and means correlated with the surface and operable by the fan to tilt the surface.

9. In a flying machine, the combination of an aeroplane surface, a wind-operated fan mounted on the machine, a device automatically operating to balance the average wind pressure tending to rotate the fan, and means operated by the fan to tilt the aeroplane surface when the momentary balance is disturbed.

10. In a flying machine, the combination of an aeroplane surface, a wind operated fan mounted on the machine, a resilient device automatically operating to balance the average wind pressure tending to rotate the fan, and means operated by the fan to tilt the areoplane surface when the momentary balance is disturbed.

11. In a flying machine, the combination of an aeroplane surface, a wind-operated fan mounted on the machine, a device automatically operating to balance the average wind pressure tending to rotate the fan, means operated by the fan to tilt the aeroplane surface when the momentary balance between the fan and the device is disturbed, and means for adjusting the device and the amount of tilt of the aeroplane surface for a given wind pressure on the fan.

12. In a flying machine, an aeroplane surface, a wind-driven fan, mechanism correlated with the surface and operable by the fan to tilt the surface, a second wind-driven fan and means operable by the second fan to tilt the said surface in a direction opposite to that in which the surface is tilted by the first fan.

13. In a flying machine, an aeroplane surface, a wind driven fan, means correlated with the fan and operating to oppose automatically sudden changes of speed in the fan, means correlated with the surface and operable by the fan to tilt the surface, a second wind-driven fan and means operable by the second fan to tilt the said surface in a direction opposite to that in which the surface is tilted by the first fan.

14. In a flying machine, an aeroplane surface, a vertical wind-driven fan having flywheel effect, means correlated with the said surface and adapted to be operated by the fan to tilt the said surface and means, comprising a second vertical wind-driven fan correlated with the said first wind-driven fan, adapted to oppose momentarily the tilting action of the said first fan on the occurrence of sudden changes in relative headway of the aeroplane.

15. In a flying machine, the combination of an inclined aeroplane surface tending to steer the machine downwardly, a wind-operated fan, a yieldingly mounted aeroplane surface, means connected with the latter surface and operable by the fan to tilt the said latter surface and thereby oppose the down steering of the first said surface.

16. In a flying machine, a main frame, a wind operated fan mounted in the locality of each lateral extremity of the frame, means automatically operating to balance the average wind pressure tending to rotate each fan, a deflectable aeroplane surface in the proximity of each fan, and means operatively connected with each aeroplane surface, adapted to be operated by the corresponding fan to tilt the respective aeroplane surface when the momentary balance between the fan and said balancing means is disturbed.

17. In a flying machine, a main frame, a wind operated fan in the locality of each lateral extremity of the frame, a longitudinally disposed vertical surface, and means to deflect the vertical surface about a vertical axis and thereby promote stability of the aeroplane, said means comprising mechanisms operated by the fans and operating members connecting the mechanisms and the vertical surface.

18. In a flying machine, a horizontally acting wind-driven fan, an aeroplane surface, a pivot, a link centered on the pivot, connected with the surface and the fan, and adapted to be turned by the fan about the pivot to tilt the said surface.

19. In a flying machine, a horizontally acting wind-driven fan, an aeroplane surface, a movable mounted pivot, a link centered on the pivot, connected with the surface and the fan and adapted to be turned about the pivot by the fan and thereby tilt the said surface, and means connected with the pivot and adapted to be manually operated to shift the pivot and the link and thereby tilt the surface independently of the fan.

20. In a flying machine, a main frame, a wind-driven fan, a flywheel rotated by the fan and journaled to have a normal plane of rotation relative to the main frame and adapted to tilt and thereby alter its plane of rotation, a deflectable aeroplane surface correlated with the flywheel and adapted to be tilted by the flywheel when a change in the plane of rotation occurs whereby stability of movement of the flying machine is promoted.

In testimony whereof I have signed my name to this specification in the presence of two subscribing witnesses.

SAM LEONARD WALKDEN.

Witnesses:
JOSEPH MILLARD,
J. W. PATCHING.

It is hereby certified that in Letters Patent No. 1,152,063, granted August 31, 1915, upon the application of Sam Leonard Walkden, of Muswell Hill, London, England, for an improvement in "Aeroplanes and the Like," errors appear in the printed specification requiring correction as follows: Page 1, line 37, strike out the word "tilting"; same page, lines 37–38, after the word "causing" insert the words *tilting of;* and that the said Letters Patent should be read with these corrections therein that the same may conform to the record of the case in the Patent Office.

Signed and sealed this 18th day of January, A. D., 1916.

[SEAL.]

J. T. NEWTON,

*Acting Commissioner of Patents.*

Cl. 244—29.